(12) United States Patent
Tsai (10) Patent No.: US 10,931,529 B2
(45) Date of Patent: Feb. 23, 2021

(54) TERMINAL DEVICE MANAGEMENT METHOD, SERVER, AND TERMINAL DEVICE FOR MANAGING TERMINAL DEVICES IN LOCAL AREA NETWORK

(71) Applicant: NANNING FUGUI PRECISION INDUSTRIAL CO., LTD., Nanning (CN)

(72) Inventor: I-Hsuan Tsai, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 49 days.

(21) Appl. No.: 16/507,296

(22) Filed: Jul. 10, 2019

(65) Prior Publication Data
US 2021/0014117 A1    Jan. 14, 2021

(51) Int. Cl.
*H04L 12/24*     (2006.01)
*H04L 12/46*     (2006.01)
*H04L 12/66*     (2006.01)
*H04L 29/08*     (2006.01)
*H04L 29/12*     (2006.01)

(52) U.S. Cl.
CPC ...... *H04L 41/0893* (2013.01); *H04L 12/4641* (2013.01); *H04L 12/66* (2013.01); *H04L 61/256* (2013.01); *H04L 61/2592* (2013.01); *H04L 67/141* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 6,199,172 B1* | 3/2001 | Dube | ...................... | H04L 41/00 714/11 |
| 6,256,314 B1* | 7/2001 | Rodrig | .................. | H04L 49/602 370/401 |
| 6,725,264 B1* | 4/2004 | Christy | ............. | H04L 29/12009 370/389 |
| 6,772,205 B1* | 8/2004 | Lavian | ................ | H04L 41/0213 370/254 |
| 7,469,284 B1* | 12/2008 | Dubrovsky | ........... | H04L 41/042 709/201 |
| 2004/0004555 A1* | 1/2004 | Martin | ..................... | H04Q 9/00 340/870.02 |
| 2004/0044756 A1* | 3/2004 | Johnson | .............. | H04L 41/0213 709/223 |
| 2004/0177136 A1* | 9/2004 | Chen | ...................... | H04L 41/28 709/223 |

(Continued)

*Primary Examiner* — Ayaz R Sheikh
*Assistant Examiner* — Tarell A Hampton
(74) *Attorney, Agent, or Firm* — ScienBiziP, P.C.

(57) ABSTRACT

A terminal device management method is implemented in a server coupled to a number of terminal devices. The terminal device management method includes acquiring network configuration information of each terminal device, grouping the terminal devices according to the network configuration information, selecting a preset proportion of terminal devices in each group as primary connection devices, maintaining a communication connection with the primary connection devices, and communicating with the other terminal devices in the groups through the primary terminal devices.

8 Claims, 9 Drawing Sheets

Acquiring network configuration information of each terminal device and grouping the terminal devices according to the network configuration information — S21

Selecting a preset proportion of terminal devices in each group as primary connection devices, maintaining a communication connection with the primary connection devices, and notifying the other terminal devices in the groups to communicate with the primary connection devices within the group through an FRMP protocol — S22

(56) References Cited

U.S. PATENT DOCUMENTS

| | | | |
|---|---|---|---|
| 2005/0015485 A1* | 1/2005 | Keefer | H04L 43/00 709/224 |
| 2005/0105508 A1* | 5/2005 | Saha | H04L 29/1233 370/352 |
| 2006/0085346 A1* | 4/2006 | Riley | H04L 41/12 705/51 |
| 2006/0092860 A1* | 5/2006 | Higashitaniguchi | H04L 41/12 370/255 |
| 2006/0092931 A1* | 5/2006 | Walter | H04L 41/28 370/389 |
| 2007/0147347 A1 | 6/2007 | Ristock | |
| 2010/0002694 A1* | 1/2010 | Matsukawa | H04L 41/12 370/389 |
| 2010/0268822 A1* | 10/2010 | Calippe | H04L 41/0816 709/225 |
| 2011/0317834 A1* | 12/2011 | Chaturvedi | H04L 63/061 380/255 |
| 2012/0166575 A1* | 6/2012 | Ogawa | H04L 41/0896 709/217 |
| 2012/0296968 A1 | 11/2012 | Lin et al. | |
| 2013/0031201 A1* | 1/2013 | Kagan | H04L 63/029 709/213 |
| 2017/0085488 A1* | 3/2017 | Bhattacharya | H04L 41/0806 |

* cited by examiner

TERMINAL DEVICE MANAGEMENT METHOD, SERVER, AND TERMINAL DEVICE FOR MANAGING TERMINAL DEVICES IN LOCAL AREA NETWORK

FIELD

The subject matter herein generally relates to communication technology, and more particularly to a terminal device management method for managing terminal devices in a local area network.

BACKGROUND

In existing network management systems, each terminal device in a network may establish connection with a network address translation (NAT) device, which requires a large amount of bandwidth resources. Another network management system may use an SNMP protocol to monitor terminal devices that have an IP address, but the terminal devices that do not have an IP address cannot be monitored by a server. When terminal devices are remotely managed by a server, commonly used protocols such as SNMP or TR069 do not have the function of intelligently classifying the terminal devices.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 1:
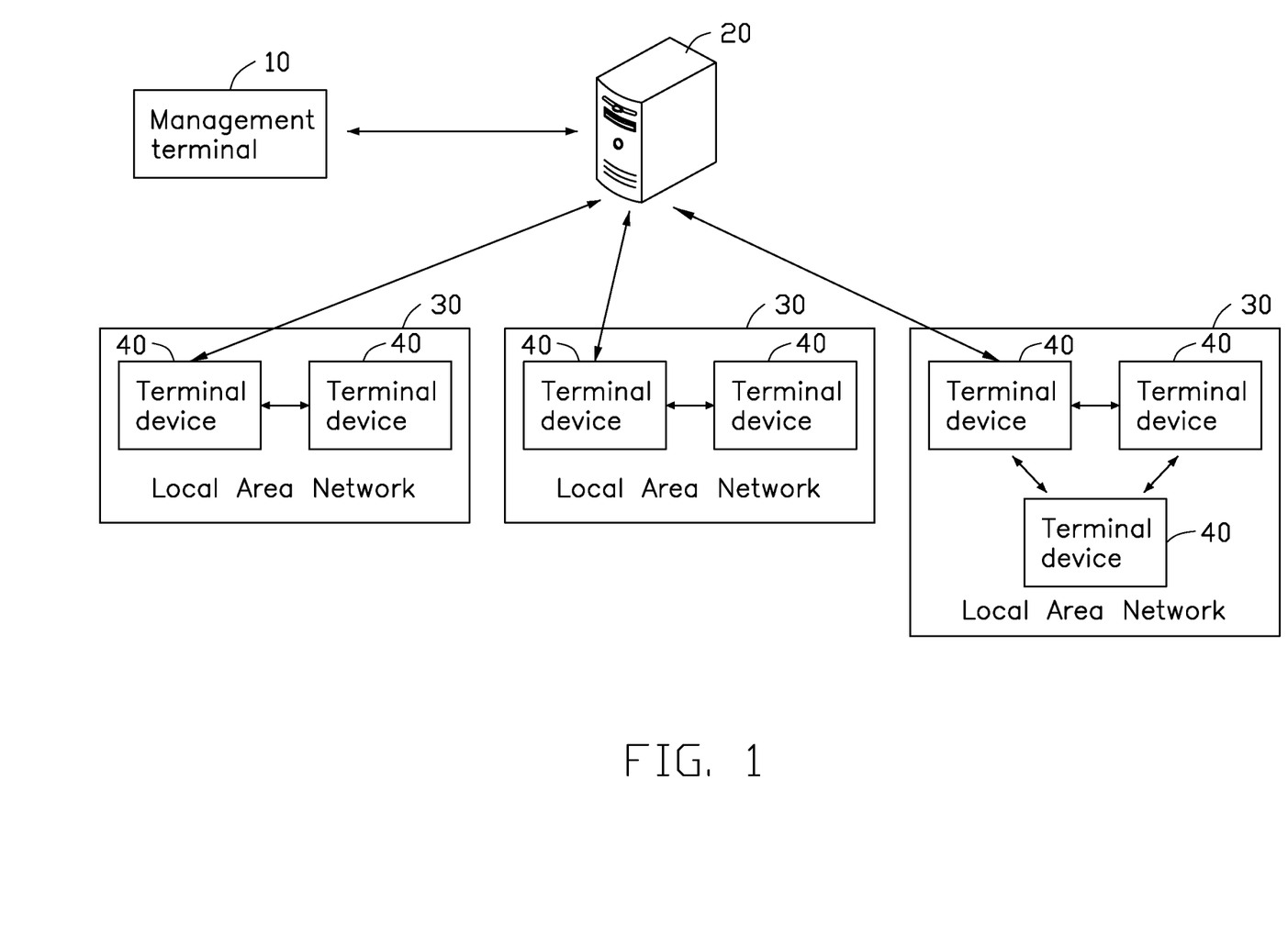
FIG. 1 is a schematic diagram of an embodiment of a terminal device management system.

FIG. 1 shows an embodiment of a terminal device management system. In one embodiment, the terminal device management system includes at least one management terminal 10, a server 20, and at least one local area network (LAN) 30. Each LAN 30 includes a plurality of terminal devices 40. It should be understood that the terminal device management system further includes other communication devices, such as a gateway, a network address translation (NAT) device, and the like, which are not shown.

The server 20 is in communication with the management terminal 10 and the terminal devices 40 in each LAN 30, and the management terminal 10 remotely manages the plurality of terminal devices 40 in each LAN 30 through the server 20. In one embodiment, the management terminal 10 intelligently groups, monitors, and manages the terminal devices 40. The management terminal 10 selects a few terminal devices 40 of each group as primary connection devices to maintain connection with the server 20 (for example, maintaining a communication connection through a TCP/IP protocol). Functions of searching, connecting, and data interacting between terminal devices 40 in the same LAN 30 are realized by Failure Report Monitoring Protocol (FRMP). When the server 20 needs to establish a communication connection with other terminal devices 40 other than the primary connection device in the group, the server 20 sends a connection request to the primary connection device, and the primary connection device transfers the connection request through the FRMP protocol to the other terminal device 40 that the server 20 requests to connect with, so that the terminal device 40 receiving the connection request passes an existing transport layer protocol to establish connection with the server 20. For example, when a terminal device 40 in the LAN 30 does not have an IP address, the terminal device 40 without the IP address may first establish communication with the primary connection device having a normal IP address to communicate with the server 20.

The management terminal 10 is used by a network administrator to monitor and manage the terminal devices 40. The management terminal 10 can be, but is not limited to, a personal computer, a smart phone, or a tablet computer.

The server 20 can be a cloud server, a server cluster, or a single server.

The terminal device 40 may be, but is not limited to, a personal computer, a network telephone, or a network printer.

Figure 2:
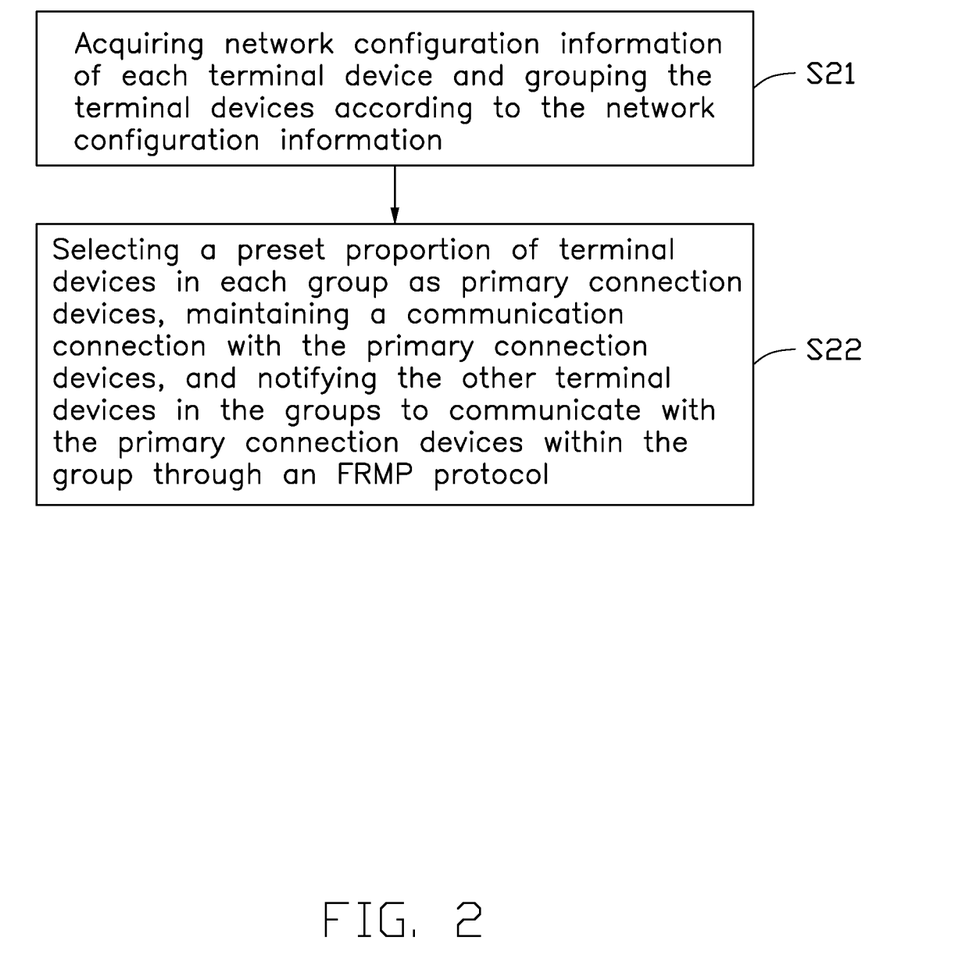
FIG. 2 is a flowchart of an embodiment of a method for grouping terminal devices.

FIG. 2 is a flowchart of a method for grouping terminal devices. The order of blocks in the flowchart may be changed according to different requirements, and some blocks may be omitted.

At block S21, the server 20 acquires network configuration information of each terminal device 40, and groups the terminal devices 40 according to the network configuration information.

Specifically, the network configuration information includes a gateway Media Access Control (MAC) address corresponding to the terminal device 40. In addition, when the LAN 30 of the terminal device 40 is further divided into a plurality of virtual local area networks (VLANs), the network configuration information further includes a VLAN ID to which the terminal device 40 belongs.

After obtaining the network configuration information of each terminal device 40, the terminal devices 40 are grouped according to the gateway MAC address of the terminal devices 40. The terminal devices 40 having the same gateway MAC addresses are divided into the same group. Further, the terminal devices 40 having the same gateway MAC address are further grouped according to the VLAN ID, and the terminal devices 40 having the same VLAN ID are further grouped into a same sub-group. For example, all terminal devices 40 having the gateway MAC address A are grouped into the same group "a". When the terminal devices 40 having the gateway MAC address A are further grouped into VLAN 1 and VLAN 2, the terminal devices 40 in VLAN 1 are grouped into the same sub-group "a1", and the terminal devices 40 in VLAN 2 are grouped into the same sub-group "a2".

In one embodiment, at block S21, the terminal devices 40 are displayed in the management terminal 10 according to the groups. Thus, it is convenient for management personnel to search and manage the terminal devices 40.

At block S22, the server 20 selects a preset proportion of terminal devices 40 in each group as primary connection devices, maintains a communication connection with the primary connection devices, and notifies the other terminal devices 40 in the groups to communicate with the primary connection devices within the group through the FRMP protocol.

Specifically, the preset proportion of the terminal devices 40 may be randomly selected or may be selected according to device parameters. For example, in one embodiment, when there are thirty terminal devices 40, one tenth of the terminal devices 40 are selected as the primary connection devices, that is, three of the terminal devices 40 are selected as the primary connection devices. When the number of terminal devices 40 in the group is less than or equal to a preset number (for example, 3), all the terminal devices 40 are regarded as primary connection devices. It can be understood that the number of the main connection devices can be set according to requirements.

In other embodiments, before block S22, whether the terminal devices 40 in the group are behind a NAT device is determined.

If the terminal devices 40 are behind a NAT device, a preset proportion of the terminal devices 40 is selected as the primary connection devices to maintain a communication connection, and the other terminal devices 40 are notified to communicate with the primary connection devices within the group through the FRMP protocol.

Specifically, the server 20 determines whether the terminal devices 40 are behind a NAT device according to a source address of data packets transmitted by each terminal device 40 and the IP address reported by the terminal devices 40. If the source address is the same as the IP address, the terminal devices 40 are not behind a NAT device. If the source address is not the same as the IP address, the terminal devices 40 are behind a NAT device.

If the terminal devices 40 are not behind a NAT device, the server 20 establishes a communication connection directly with all of the terminal devices 40 in the group.

The terminal devices 40 communicate within the local area network 30 through the FRMP protocol. The server 20 maintains connection with the primary connection devices in the local area network 30 and communicates with the other terminal devices 40 indirectly through the primary connection devices. Thus, less network bandwidth is required, and network resources are more efficiently used.

Figure 3:
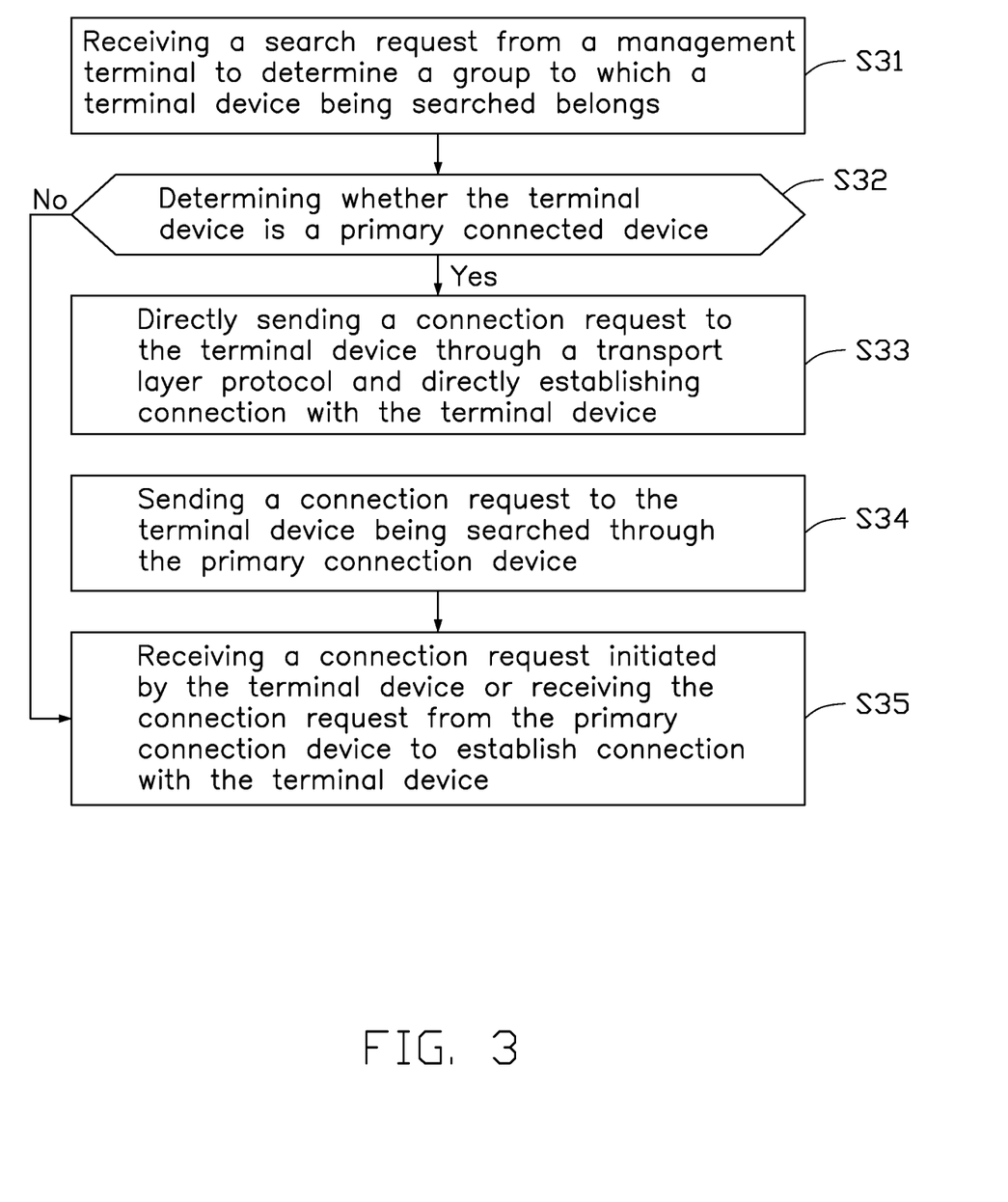
FIG. 3 is a flowchart of a terminal device management method implemented in a server.

FIG. 3 is a flowchart of a terminal device management method implemented in a server. The order of blocks in the flowchart may be changed according to different requirements, and some blocks may be omitted.

At block S31, the server 20 receives a search request from the management terminal 10 to determine the group to which a terminal device 40 being searched belongs.

At block S32, whether the terminal device 40 is a primary connected device is determined. If the terminal device 40 is a primary connected device, block 33 is implemented. If the terminal device 40 is not a primary connected device, block S34 is implemented.

At block S33, the server 20 directly sends a connection request to the terminal device 40 through a transport layer protocol and directly establishes connection with the terminal device 40.

At block S34, the server 20 sends a connection request to the primary connection device through a transport layer protocol, and the primary connection device transfers the connection request through the FRMP protocol to the terminal device 40 being searched. The terminal device 40 can then initiate a connection request with the server 20 for message transmission or transfers the connection request through the primary connection device to the server 20.

At block S35, the server 20 receives the connection request initiated by the terminal device 40 or receives the connection request from the primary connection device to establish connection with the terminal device 40.

In one embodiment, if the connection between the server 20 and one of the primary connection devices in the group is disconnected, the server 20 selects another terminal device 40 to replace the disconnected primary connection device.

Figure 4:
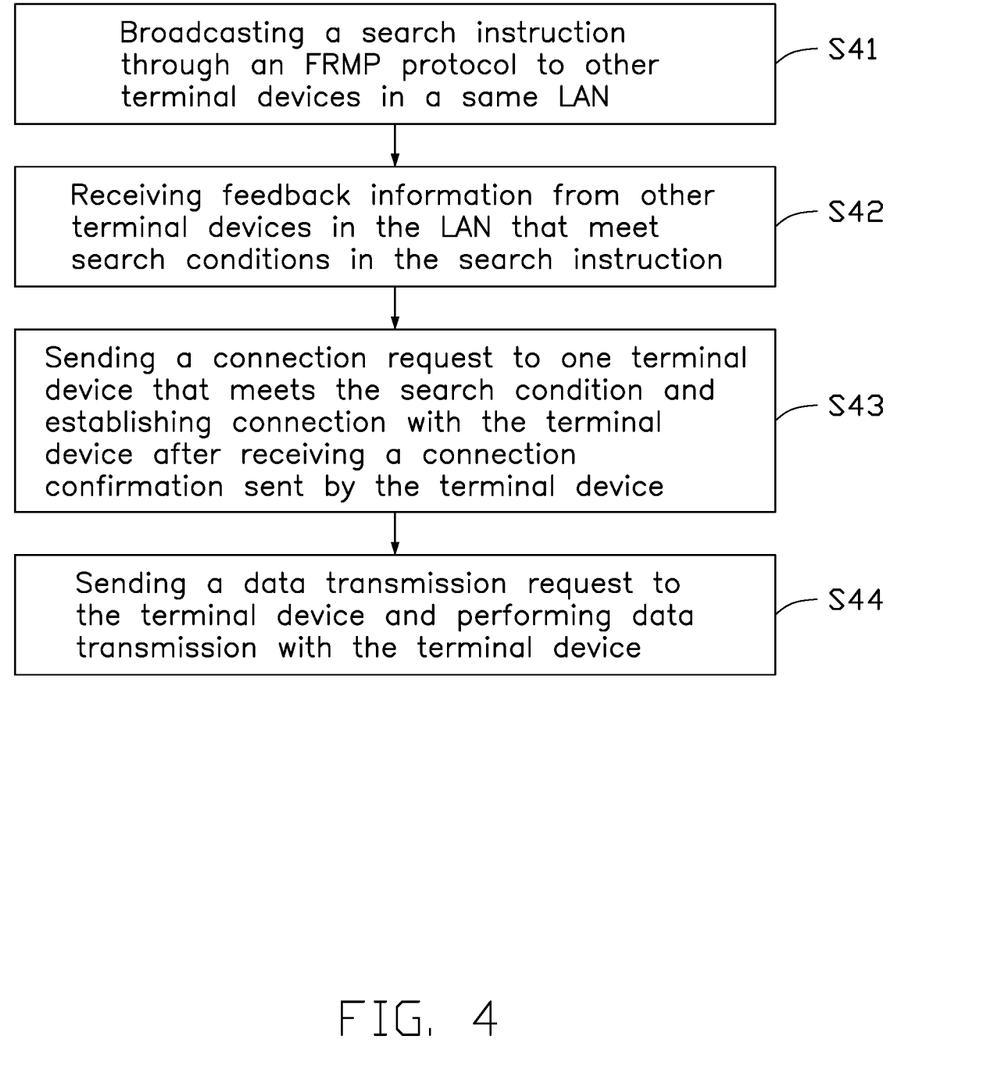
FIG. 4 is a flowchart of a terminal device management method implemented in a terminal device in a local area network (LAN).

FIG. 4 is a flowchart of a terminal device management method implemented in a terminal device in a LAN. The local area network includes a plurality of terminal devices 40, and the plurality of terminal devices 40 communicate with each other through the FRMP protocol in the LAN. The terminal device 40 implementing the method is a connection initiating terminal device. The order of blocks in the flowchart may be changed according to different requirements, and some blocks may be omitted.

At block S41, the connection initiating terminal device broadcasts a search instruction through the FRMP to other terminal devices 40 in the same LAN.

The search instruction includes a search condition, and the search condition includes, but is not limited to, device model information, IP address information, server configuration information, and the like of the terminal device 40.

In one embodiment, the connection initiating terminal device is a primary connection device in the LAN 30, and the search instruction is received by the connection initiating terminal device from the server 20. For example, a LAN 30 includes four IP phones A, B, C, and D. IP phone A is the primary connection device maintaining a communication connection with the server 20, and the IP phones B, C, and D communicate with the IP phone A through the FRMP protocol. When the server 20 searches a status of the IP phone C according to a search instruction of the management terminal 10, the server 20 first determines that the IP phone A is the primary connection device in the LAN, then the server 20 sends a search instruction for searching the IP phone C to the IP phone A. The IP phone A receives the search instruction from the server 20 and broadcasts the search instruction in the LAN 30 through the FRMP protocol.

In other embodiments, the search instruction may be automatically generated by the connection initiating terminal device in the LAN 30.

For example, in one embodiment, when the LAN 30 includes four terminal devices 40, and one of the terminal devices 40 needs to perform a software update, the terminal device 40 that needs to perform the software update is the connection initiating terminal device and automatically generates a search instruction to find a terminal device 40 in the LAN 30 that is the same device model having already the updated software installed.

In another embodiment, if the IP address of a terminal device 40 in the LAN 30 is abnormal and needs to be reported to the server 20, the abnormal terminal device 40 is the connection initiating terminal device and automatically generates a search instruction to find the terminal device 40 in the LAN 30 that can establish connection with the server 20.

In another embodiment, a terminal device 40 in the LAN 30 that does not have an address setting of the server 20 is the connection initiating terminal device and automatically generates a search instruction to find a terminal device 40 in the LAN 30 that has the address setting of the server 20, so that the connection initiating terminal device can acquire the address setting of the server 20 from the terminal device 40.

At block S42, the connection initiating terminal device receives feedback information from other terminal devices 40 in the LAN that meet the search conditions in the search instruction.

For example, when the search instruction is sent by the server 20 to find the IP phone C, the IP phone A receives the feedback information from the IP phone C that meets the search condition. When the search instruction is sent by the connection initiating terminal device to find the terminal device 40 in the LAN 30 that is the same device model and having the updated software installed, the connection initiating terminal device receives the feedback information from the terminal device 40 that meets the search condition of being the same device model and having the updated software installed. When the search instruction is sent by the connection initiating terminal device to find a terminal device in the LAN 30 that is capable of establishing connection with the server 20, the connection initiating terminal device receives the feedback information from the terminal device 40 that meets the search condition of being capable of establishing connection with the server 20. When the search instruction is sent by the connection initiating terminal device to find a terminal device in the LAN 30 having the address setting of the server 20, the connection initiating terminal device receives the feedback information from the terminal device 40 that meets the search condition of having the address setting of the server 20.

At block S43, the connection initiating terminal device sends a connection request to one terminal device 40 that meets the search condition, and establishes connection with the terminal device 40 after receiving a connection confirmation sent by the terminal device 40.

At block S44, the connection initiating terminal device sends a data transmission request to the terminal device 40 and performs data transmission with the terminal device 40.

Specifically, when the search instruction is received from the server 20, the connection initiating terminal device transfers the search instruction to the terminal device 40 searched by the server 20, and the terminal device 40 searched by the server 20 establishes data transmission with the server 20 after establishing connection.

When the search instruction is to find a terminal device 40 in the LAN being the same device model and having the updated software installed, the data transmission is the connection initiating terminal device acquiring the updated software from the terminal device 40 and performs a software update.

When the search instruction is to search for a terminal device 40 in the LAN 30 that can establish connection with the server 20, the data transmission is the connection initiating terminal device reporting to the server 20 through the terminal device 40 that can establish connection with the server 20 in the situation when the connection initiating terminal device has an abnormality such as an abnormal IP address.

When the search instruction is to find a terminal device 40 in the LAN 30 having the address setting of the server 20, the data transmission is the connection initiating terminal device acquiring the address setting of the server 20 from the terminal device 40 having the address setting of the server 20, thereby establishing connection with the server 20.

Figure 5:
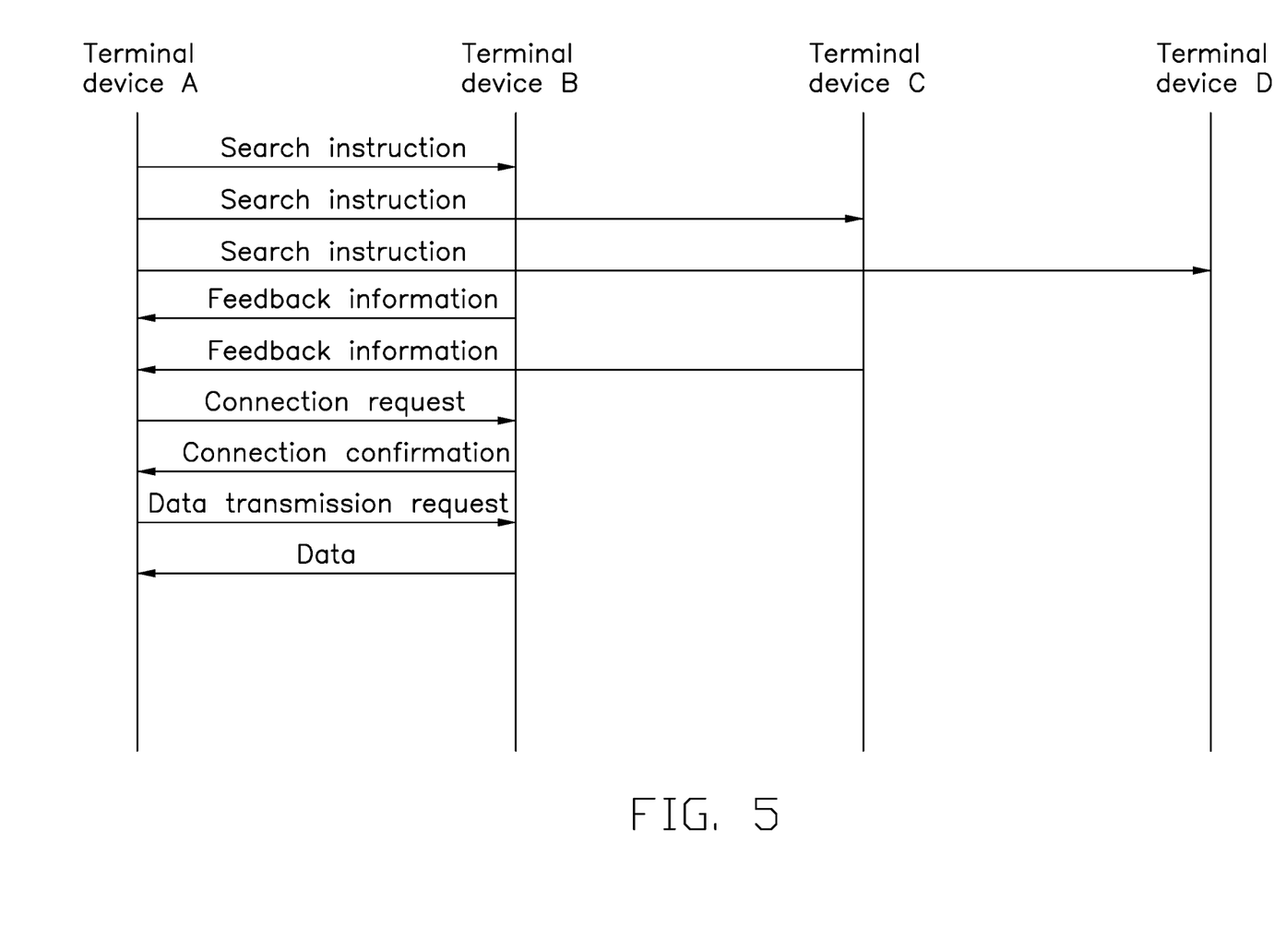
FIG. 5 is a schematic diagram of interaction between terminal devices corresponding to the terminal device management method in FIG. 4.

FIG. 5 is a schematic diagram of interaction between the terminal devices 40 corresponding to the terminal device management method in FIG. 4. As shown in FIG. 5, the terminal device A in the LAN is the connection initiating terminal device and broadcasts a search instruction to the terminal devices B, C, and D in the same LAN. If the terminal device B and the terminal device C meet the search condition in the search instruction, the terminal device B and the terminal device C send feedback information to the terminal device A. The terminal device D that does not meet the search condition does not send the feedback information. After receiving the feedback information, the terminal device A sends a connection request to the terminal device B, the terminal device B returns a connection confirmation, and the terminal device A establishes connection with the terminal device B. The terminal device A sends a data transmission request to the terminal device B, and the terminal device B sends data, such as a software update, to the terminal device A through the FRMP protocol.

Figure 6:
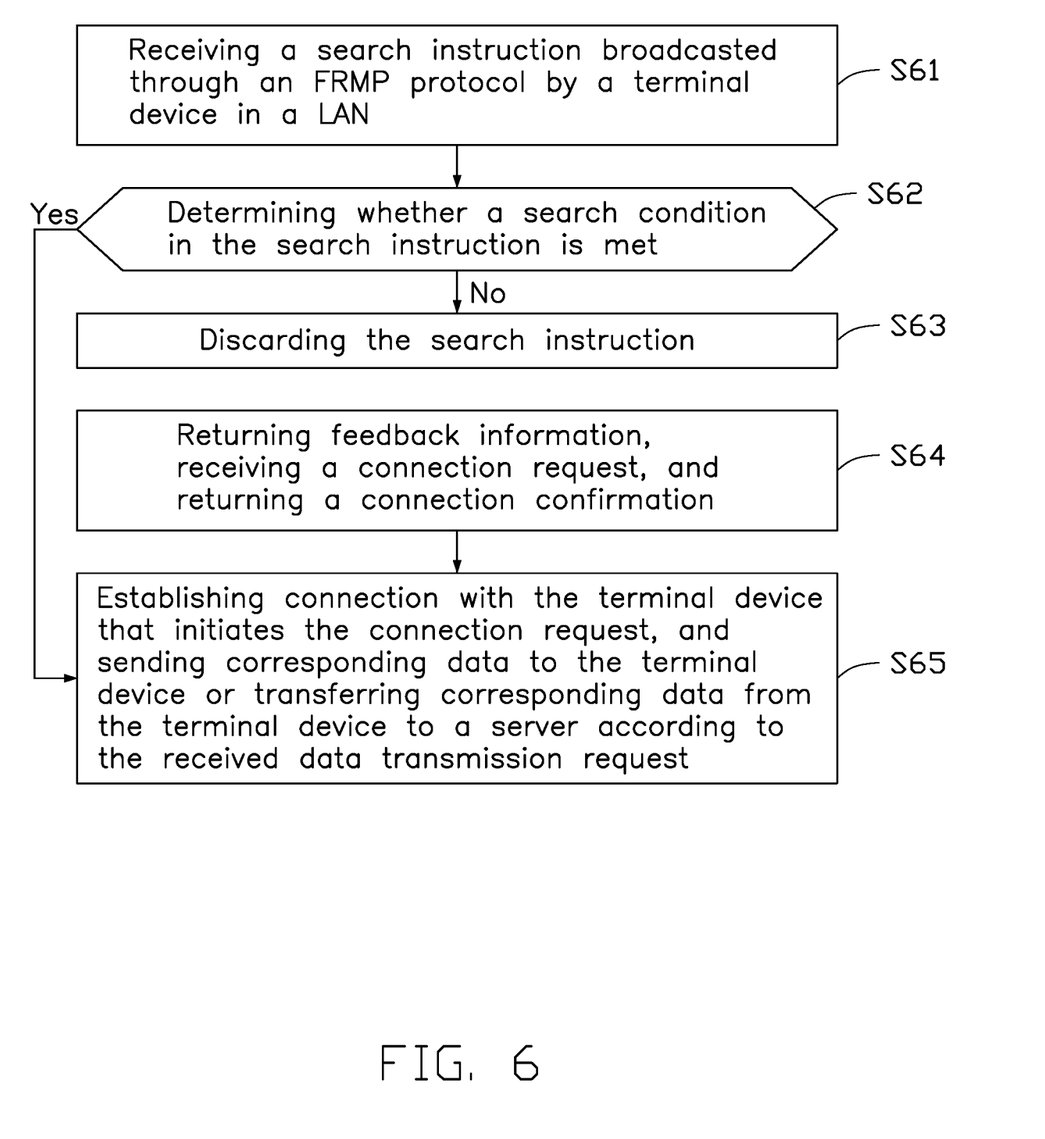
FIG. 6 is a flowchart diagram of another embodiment of a terminal device management method implemented in a terminal device in a LAN.

FIG. 6 is a flowchart diagram of another embodiment of a terminal device management method implemented in terminal devices in a LAN. The local area network includes a plurality of terminal devices 40, and the plurality of terminal devices 40 communicate with each other through the FRMP protocol in the LAN. The terminal device 40 implementing the method is a connection receiving terminal device. The order of blocks in the flowchart may be changed according to different requirements, and some blocks may be omitted.

At block S61, the connection receiving terminal device receives a search instruction broadcasted through the FRMP protocol by a terminal device 40 in the LAN.

At block S62, the connection receiving terminal device determines whether a search condition in the search instruction is met.

At block S63, if the search condition in the search instruction is not met, the search instruction is discarded.

At block S64, if the search condition in the search instruction is met, the connection receiving terminal device returns feedback information, receives a connection request, and returns a connection confirmation.

At block S65, the connection receiving terminal device establishes connection with the terminal device 40 that initiates the connection request, and sends corresponding data to the terminal device 40 according to the received data transmission request, transfers corresponding data from another terminal device to the server according to the data transmission request, or sends the searched data to the server 20 according to the search request transferred by another terminal device 40. For example, the terminal device 40 may send an updated software to another terminal device according to a software updating request. In another example, the terminal device 40 may send a server address configuration to another terminal device according to a server address configuration request. In another example, if another terminal device is abnormal and has no IP address, the terminal device 40 may transfer the abnormal situation of the abnormal terminal device to the server 20. In another example, the terminal device may connect to the server 20 according to a search request transferred by the primary terminal device.

In one embodiment, during interaction between the terminal devices 40 through the FRMP protocol, each data frame corresponds to an acknowledgement frame. After a sending terminal device 40 sends a data frame to a receiving terminal device 40, the receiving terminal device 40 returns an acknowledgement frame, and the data frame and the acknowledgement frame constitute a pair.

In one embodiment, in a process of establishing connection between terminal devices 40 in the same group through the FRMP protocol, a retransmission mechanism is used. For example, if an acknowledgement frame is not received within a preset time interval, such as 100 ms, the data frame is retransmitted. If the acknowledgement frame is not received after retransmitting a preset number of times, such as three times, it is determined that the connection has timed out.

Figure 7:
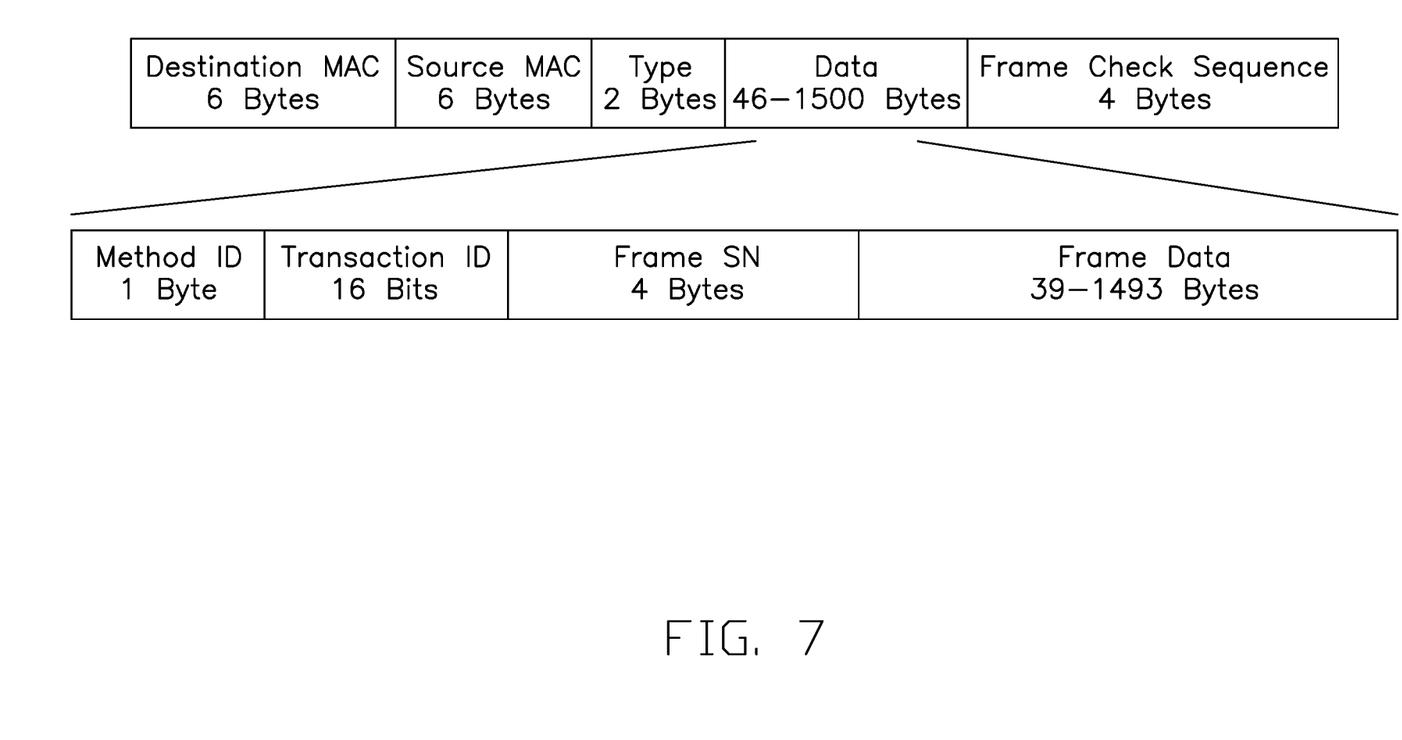
FIG. 7 is a schematic diagram of a data frame structure in a failure report management protocol (FRMP).

FIG. 7 shows a schematic diagram of a data frame structure in the FRMP protocol. In one embodiment, data in the FRMP protocol is encapsulated in a data field in an Ethernet II frame. Specifically, the Ethernet II frame includes a destination MAC address field, a source MAC address field, an Ethernet frame data type field, a data field, and a frame check sequence field. A length of the destination MAC address field is 6 bytes, a length of the source MAC address field is 6 bytes, a length of the Ethernet frame data type field is 2 bytes, a length of the data field is 46-1500 bytes, and a length of the frame check sequence field is 4 bytes.

FRMP protocol data is encapsulated in the data field of the Ethernet II frame. The FRMP protocol data format includes a Method ID field, a Transaction ID field, a Frame SN field, and a Frame Data field. In one embodiment, the Method ID field has a length of 1 byte, the Transaction ID field has a length of 2 bytes, the Frame SN field has a length of 4 bytes, and the Frame Data field has a length of 39-1493 bytes.

The Method ID field is used to identify a purpose of the frame. The purpose identified by the Method ID includes a search request (DISCOVER) data frame, a search request feedback (DISCOVER ACK) data frame, a connection request (CONNECT) data frame, a connection request feedback (CONNECT ACK) data frame, a disconnect (DISCONNECT) data frame, a keep alive (KA) data frame, a data transfer (RELAY/BINARY) data frame, a data transfer feedback (RELAY ACK/BINARY ACK) data frame, and the like.

The DISCOVER data frame of the Method ID is used by the connection initiating terminal device to broadcast the search instruction in the group.

The DISCOVER ACK data frame of the Method ID is used by the connection receiving terminal device that meets the search condition to feedback to the connection initiating terminal device. When the data in the search request is too long and cannot be encapsulated in one DISCOVER data frame, the data is encapsulated in multiple data frames, and the data frames are broadcast to other terminal devices 40 in the LAN 30 at predetermined intervals, such as 50 ms. The other terminal devices 40 return the DISCOVER ACK data frame after receiving all the data frames having the same Transaction ID and confirming that the search condition is met.

The CONNECT data frame of the Method ID is sent to a target terminal device 40 to establish a connection based on the FRMP protocol with the target terminal device 40. The MAC address in the Ethernet II data frame is the target terminal device 40.

The CONNECT ACK data frame of the Method ID is sent by the target terminal device 40 to the terminal device 40 initiating the connection with the target terminal device 40. If the target terminal device 40 agrees to establish connection, the data field in the data frame is set to 1. If the target terminal device 40 rejects to establish connection, the data field in the data frame is set to 0. After connection is established, data transmission can be performed between the initiating terminal device 40 and the target terminal device 40.

The DISCONNECT data frame of the Method ID is for disconnecting communication between terminal devices 40. The terminal device 40 transmitting or receiving the data frame will clear all resources of the connection and ignore all data frames sent from the disconnected terminal device 40.

The KA data frame of the Method ID is for testing whether an established connection between terminal devices 40 is normal. The terminal device 40 receiving the KA data frame copies the KA data frame and returns the copied KA data frame to confirm that the connection is normal. In addition, if the connection includes a timer and both terminal devices 40 need to periodically send data frames, the KA data frame is sent if there is no actual data interaction between the two terminal devices 40 to maintain the connection. The connection is terminated when the timer expires.

The RELAY or BINARY data frame of the Method ID is used for data transmission. The RELAY data frame is used for transmitting user data, such as original file data, request commands, configuration information, running status information, and the like. The BINARY data frame is used for transmitting configuration file data, such as uploading logs, downloading configuration files, and downloading firmware.

The RELAY ACK data frame is used for confirming the RELAY data frame. The Transaction ID and the Frame SN must be the same as the RELAY data frame to be confirmed. The BINARY ACK data frame is used for confirming the BINARY data frame. The Transaction ID and the Frame SN must be the same as the BINARY data frame to be confirmed.

Regarding the Transaction ID field, if the data to be transmitted in the same method is too long to be encapsulated into a single data frame, the data is split into multiple data frames for transmission having the same Transaction ID. As discussed above, when the data under the DISCOVER data frame is too long and cannot be encapsulated into a single data frame, the data is encapsulated into multiple data frames having the same Transaction ID and broadcasted at preset intervals (for example, 50 ms) to other terminal devices 40 in the LAN. Other terminal devices 40 that meet the search conditions return the DISCOVER ACK data frame. The length of the Transaction ID is 2 bytes, wherein the first byte is used to identify the terminal device 40 that generates the data. When the data is generated by the connection initiating terminal device, the first byte is 1. When the data is generated by the connection receiving terminal device, the first byte is 0.

The Frame SN field is used to identify the sequence number of the frame. In one embodiment, the Frame SN field includes 4 bytes, wherein the first two bytes represent the current frame sequence number, and the last two bytes represent the total number of frames. For example, in one data frame, the first two bytes are 0x0002, and the last two bytes are 0x0005, which indicates that there are five frames in total, and the current frame is the second frame among the 5 frames.

The Frame Data field is data to be transmitted. A format and length of the data to be transmitted is different according to the Method ID field.

Figure 8:
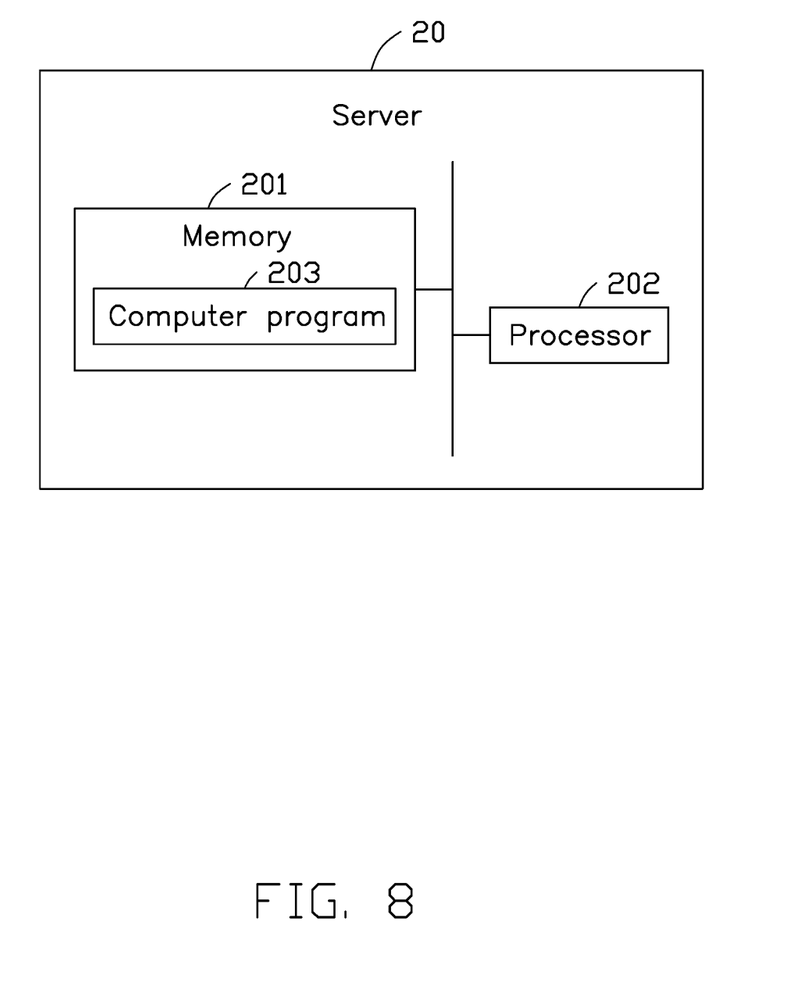
FIG. 8 is a schematic block diagram of an embodiment of a server.

FIG. 8 shows a schematic block diagram of an embodiment of a server 20. The server 20 includes a memory 201 and a processor 202. The memory 201 stores a computer program 203, such as a terminal device management program, which is executable by the processor 202. When the processor 202 executes the computer program 203, the blocks in one embodiment of the terminal device management method applied in the server 20 are implemented, such as blocks S21 to S22 shown in FIG. 2 or blocks S31 to S35 shown in FIG. 3.

It will be understood by those skilled in the art that FIG. 8 is merely an example of the server 20 and does not constitute a limitation to the server 20. The server 20 may include more or less components than those illustrated, or may combine certain components. The server 20 may also include input and output devices, network access devices, buses, and the like.

The computer program 203 can be partitioned into one or more modules/units that are stored in the memory 203 and executed by the processor 202. The one or more modules/units may be a series of computer program instructions capable of performing particular functions of the computer program 203.

The processor 202 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 202 may be a microprocessor or other processor known in the art.

The memory 201 can be used to store the computer program 203 and/or modules/units by running or executing computer programs and/or modules/units stored in the memory 201. The memory 201 may include a storage program area and a storage data area. In addition, the memory 201 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

Figure 9:
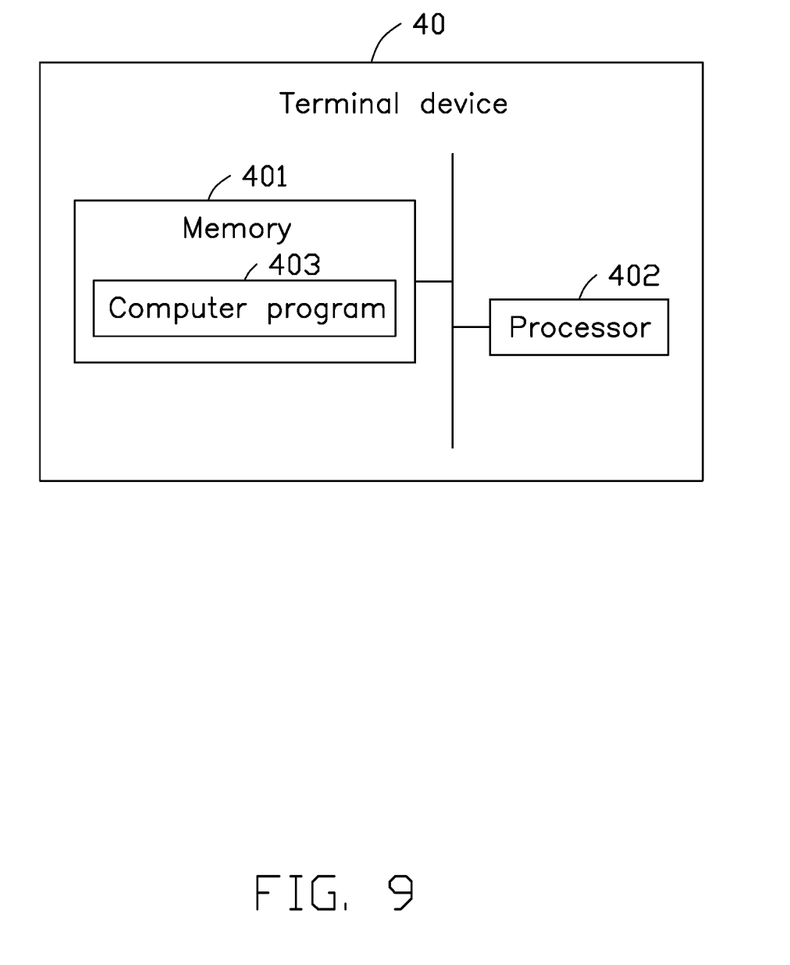
FIG. 9 is a schematic block diagram of an embodiment of a terminal device.

FIG. 9 is a schematic block diagram of an embodiment of a terminal device 40. The terminal device 40 includes a memory 401 and a processor 402. The memory 401 stores a computer program 403, such as a terminal device management program, which is executable by the processor 402. When the processor 402 executes the computer program 403, the blocks in one embodiment of the terminal device management method applied to the local area network are implemented, such as blocks S41 to S44 shown in FIG. 4 or blocks S61 to S66 shown in FIG. 6.

It will be understood by those skilled in the art that FIG. 9 is merely an example of the terminal device 40 and does not constitute a limitation to the terminal device 40. The terminal device 40 may include more or less components than those illustrated, or may combine certain components. The terminal device 40 may also include input and output devices, network access devices, buses, and the like.

The processor 402 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 402 may be a microprocessor or other processor known in the art.

The memory 401 can be used to store the computer program 403 and/or modules/units by running or executing computer programs and/or modules/units stored in the memory 401. The memory 401 may include a storage program area and a storage data area. In addition, the memory 401 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A terminal device management method implemented in a server coupled to a plurality of terminal devices, the terminal device management method comprising:
    acquiring network configuration information of each terminal device, and grouping the terminal devices according to the network configuration information;
    selecting a preset proportion of terminal devices in each group as primary connection devices, maintaining a communication connection with the primary connection devices, and communicating with the other terminal devices in the groups through the primary terminal devices;
    determining whether the terminal devices in the group are behind a NAT device;
    selecting a preset proportion of the terminal devices as the primary connection devices to maintain a communication connection, if the terminal devices are behind a NAT device, and notifying the other terminal devices to communicate with the primary connection devices within the group;
    establishing a communication connection directly with all of the terminal devices in the group if the terminal devices are not behind a NAT device.

2. The terminal device management method of claim 1, wherein:
    the network configuration information comprises a gateway Media Access Control (MAC) address corresponding to the terminal device and a virtual local area network (VLAN) ID to which the terminal device belongs.

3. The terminal device management method of claim 2, further comprising:
   displaying the terminal devices in a management terminal according to the group.

4. The terminal device management method of claim 1, further comprising:
   receiving a search request from the management terminal to determine the group to which a terminal device being searched belongs;
   determining whether the terminal device being searched is a primary connected device;
   directly sending a connection request to the terminal device being searched through a transport layer protocol, if the terminal device being searched is a primary connected device, and directly establishing connection with the terminal device;
   sending a connection request to the primary connection device through a transport layer protocol, if the terminal device being searched is not a primary connected device, wherein the primary connection device transfers the connection request to the terminal device being searched;
   receiving a connection request initiated by the terminal device or receiving the connection request from the primary connection device to establish connection with the terminal device.

5. A terminal device management method implemented in a connection initiating terminal device in a local area network (LAN) comprising a plurality of terminal devices, the terminal device management method comprising:
   broadcasting a search instruction to other terminal devices in the LAN, the search instruction comprising a search condition, wherein the search instruction sent by the connection initiating terminal device is to find a terminal device in the LAN that is the same device model and having an updated software installed;
   receiving feedback information from other terminal devices in the LAN that meet the search condition in the search instruction, wherein the connection initiating terminal device receives the feedback information from the terminal device that meets the search condition of being the same device model and having the updated software installed to receive the updated software from the terminal device;
   sending a connection request to one terminal device that meets the search condition, and establishing connection with the terminal device after receiving a connection confirmation sent by the terminal device;
   sending a data transmission request to the terminal device and performing data transmission with the terminal device.

6. The terminal device management method of claim 5, wherein:
   the connection initiating terminal device is a primary connection device in the LAN;
   the search instruction is received by the connection initiating terminal device from a server;
   the connection initiating terminal device transfers the search instruction to the other terminal devices in the LAN.

7. The terminal device management method of claim 5, wherein:
   the search instruction sent by the connection initiating terminal device is to find a terminal device in the LAN that is capable of establishing connection with the server;
   the connection initiating terminal device receives the feedback information from the terminal device that meets the search condition of being capable of establishing connection with the server.

8. The terminal device management method of claim 5, wherein:
   the search instruction sent by the connection initiating terminal device is to find a terminal device in the LAN having an address setting of the server;
   the connection initiating terminal device receives the feedback information from the terminal device that meets the search condition of having the address setting of the server.

* * * * *